United States Patent
Lim et al.

(10) Patent No.: US 7,208,536 B2
(45) Date of Patent: Apr. 24, 2007

(54) POLYPROPYLENE RESIN COMPOSITION WITH ANTI-SCRATCH CHARACTERISTICS

(75) Inventors: Jae Gon Lim, Seoul (KR); Young Sung Yoo, Seosan-shi (KR); Jae Whan Cho, Gyeonggi-do (KR); Man Saeng Her, Seosan-si (KR)

(73) Assignee: Samsung Total Petrochemicals Co., Ltd., Seosan-Shi, Chungcheongnam Province (KR)

( * ) Notice: Subject to any disclaimer, the term of this patent is extended or adjusted under 35 U.S.C. 154(b) by 0 days.

(21) Appl. No.: 11/276,200

(22) Filed: Feb. 17, 2006

(65) Prior Publication Data

US 2006/0229387 A1  Oct. 12, 2006

(30) Foreign Application Priority Data

Feb. 28, 2005 (KR) .................. 10-2005-0016604

(51) Int. Cl.
*C08K 5/54* (2006.01)
*C08J 3/22* (2006.01)
*C08L 23/10* (2006.01)

(52) U.S. Cl. .................. 524/262; 524/108; 524/451; 524/493; 524/570; 524/583; 525/240

(58) Field of Classification Search ............ 524/262, 524/108, 570, 583, 451, 493; 525/240
See application file for complete search history.

(56) References Cited

U.S. PATENT DOCUMENTS 6,495,708 B1 * 12/2002 Yang et al. .................. 556/10
6,967,225 B2 * 11/2005 Mcenhill et al. ............ 524/232

FOREIGN PATENT DOCUMENTS

WO   2005/123826   * 12/2005

* cited by examiner

*Primary Examiner*—Fred Teskin
(74) *Attorney, Agent, or Firm*—Barlow, Josephs & Holmes, Ltd.

(57) ABSTRACT

The present invention provides a propylene resin composition having excellent anti-scratch characteristic. Specifically, provided is a polyolefin resin composition comprising a high crystalline polypropylene resin, a rubber component, an inorganic filler and an aluminosiloxane masterbatch, with excellent damage resistance such as anti-scratch characteristic thereby giving very low surface damage, excellent heat resistance, good rigidity and impact properties and injection moldability, for car interior or exterior parts.

15 Claims, No Drawings

POLYPROPYLENE RESIN COMPOSITION WITH ANTI-SCRATCH CHARACTERISTICS

BACKGROUND OF THE INVENTION

The present invention relates to a propylene resin composition having excellent anti-scratch characteristic. Specifically, provided is a polyolefin resin composition comprising a high crystalline polypropylene resin, a rubber component, an inorganic filler and an aluminosiloxane masterbatch, with excellent damage resistance such as anti-scratch characteristic thereby giving very low surface damage, excellent heat resistance, good rigidity and impact properties and injection moldability, for car interior or exterior parts.

In car industry, as weight reduction and high performance of plastic materials has been continuously achieved, there has been consistently increasing demand on such plastic materials in various parts of a car. Among various plastic materials, especially the demand on polyolefin material is rapidly increasing as compared with other plastic materials, owing to its low specific gravity and accordingly low weight, easy recycling, relatively low price thereof and the like. Especially among polyolefin resins, polypropylene resin can be variously used in diverse applications, for example, as interior parts of a car such as a panel, door trim, console body, pillar, trim or the like and, as exterior parts such as a bumper, side molding or the like.

However, a polypropylene resin has an inherent limitation in that it is very difficult to obtain balanced properties between excellent flow characteristics and excellent rigidity or impact properties. To overcome said limitation of the material itself, methods for obtaining a resin composition having various characteristics has been being developed, by adjusting the amount of inorganic additives, rubber components and the like being added. Consequently, numerous polypropylene resin compositions became developed and accordingly, it naturally raised further complicating concerns regarding productivity such as molding conditions, molding techniques or the like depending on each product.

In the meantime, resin compositions used in car interior materials have a problem that the surface thereof gets easily damaged or dirty by the hand or shoes of a driver and passengers. In order to prevent such surface damage and discoloration owing to contamination, a pad type instrument panel has been provided in which a polypropylene compound composition or an engineered plastic is used as a core material, and a polyurethane foam and a polyvinylchloride (PVC) or a thermoplastic elastomer (TPE) are used as a surface coating material. However, the above method has some problems such as a requirement of an additional use of polyurethane foam and PVC or TPE for a surface coating material in its production when compared with manufacturing methods for conventional products, an increase in the number of processes leading to an increase in production cost, and an environmental pollution since the resulted products is not recyclable.

For solving these problems, other methods were suggested by replacing the polyurethane foam with a polypropylene having high melt strength, or replacing PVC with TPE to enhance the recycling. However, these methods also had problems of poor adhesion between the foam and the core layer, and increase in process cost.

On the other hand, for solving the above problems, a method has recently been developed to provide a polypropylene resin composition for car interior parts, in which a high isotactic polypropylene is used as a base resin thereby giving maximized rigidity, a reactor-made thermoplastic polyolefin (RTPO) with an increased content of ethylene-propylene rubber during propylene polymerization is used to modify impact properties under the minimized use of rubber, and at the same time, rubbers having various molecular structures such as high density polyethylene resin or styrene-ethylene-butylene-styrene terpolymer (SEBS) are additionally used to improve anti-scratch characteristic. However, when further improvement in anti-scratch characteristic is tried according to said method, an additional use of inorganic materials also increases impact properties, leading to a problem of decrease in flexural modulus.

SUMMARY OF THE INVENTION

The present invention is provided to solve above-mentioned problems and thus the object of the present invention is to provide a propylene resin composition having selectively improved anti-scratch characteristic without causing significant changes in the intrinsic balance of physical properties of the polypropylene resin, specifically without distinctive decrease or changes in flexural modulus and impact properties.

The polypropylene resin composition with excellent anti-scratch characteristic according to the present invention is characterized by comprising 35–92 wt % of a high crystalline polypropylene resin having 96% or more of isotactic pentad ratio measured by $C^{13}$-NMR, 1–30 wt % of a rubber component, 5–35 wt % of an inorganic filler and 1–10 wt % of an aluminosiloxane masterbatch, based on the total weight of the polypropylene resin composition.

DETAILED DESCRIPTION OF THE INVENTION

The high crystalline polypropylene resin used in the polypropylene resin composition of the present invention has a melt index of 8–60 g/10 min and 96% or more of the isotactic pentad ratio measured by $C^{13}$-NMR, and is preferably selected from a propylene homopolymer, a propylene-α-olefin copolymer, RTPO or the mixtures thereof. When a propylene-α-olefin copolymer is used as the high crystalline polypropylene resin, ethylene is preferably used as the α-olefin. The content of the high crystalline polypropylene resin is preferably 35–92 wt %, based on the total weight of the composition. When the content of the high crystalline polypropylene resin is less than 35 wt %, the processability of the composition becomes undesirably inferior. In the meantime, when the content of the high crystalline polypropylene resin is more than 92 wt %, the impact properties and the anti-scratch characteristic become unsatisfying.

The rubber component used in the polypropylene resin composition of the present invention is served to impart appropriately balanced flexibility to the composition, and is preferably at least one selected from the group consisting of amorphous ethylene-α-olefin copolymers and styrene-based thermoplastic elastomers. As for the α-olefin component in the amorphous ethylene-α-olefin copolymers, propylene, butene-1, pentene-1, hexene-1, heptene-1, octene-1, 4-methyl pentene-1 or the like may be mentioned. As for the styrene-based thermoplastic elastomers, SEBS (styrene-ethylene-butadiene-styrene block copolymer), SEPS (styrene-ethylene-propylene-styrene block copolymer), SEP (styrene-ethylene-propylene block copolymer), SBS (styrene-butadiene-styrene block copolymer) and the like may be mentioned. The content of the rubber component is preferably 1–30 wt % based on the total weight of the composition.

When the content of the rubber component is less than 1 wt %, impact properties become undesirably inferior. In the meantime, when the content of the rubber component is more than 30 wt %, although the impact properties may be reinforced, the rigidity becomes unsatisfying, thereby undesirably causing a difficulty in maintaining the balance between physical properties.

The inorganic filler used in the polypropylene resin composition of the present invention is served to impart appropriately balanced rigidity to the composition, and is preferably at least one selected from the group consisting of glass fiber, talc, mica, calcium carbonate, wollastonite, barium sulfate, clay, magnesium sulfate, whisker and the like. Among these, specifically preferred is a talc having an average particle size of 3–6 μm. The inorganic filler imparts rigidity balanced with flexibility to the composition, and also enhances other characteristics such as impact resistance at low temperature, rigidity or the like. The content of the inorganic filler is preferably 5–35 wt % based on the total weight of the resin composition. When the content of the inorganic filler is less than 5 wt %, the effect of reinforcing rigidity becomes low, thereby being undesirable. However, when the content of the inorganic filler is more than 35 wt %, complete dispersion can hardly be expected in compounding process, the effect of reinforcing impact properties becomes low, and weight increase is occurred, thereby being undesirable.

The aluminosiloxane masterbatch in the polypropylene resin composition of the present invention is used to selectively improve anti-scratch characteristic while preventing decrease in flexural modulus of the polypropylene resin composition. In order to achieve such selective improvement of anti-scratch characteristic without causing significant decrease or changes in other physical properties such as flexural modulus and impact properties, the present inventors have investigated various silicone compounds and consequently obtained a result that the use of aluminosiloxane can make the improvement of the anti-scratch characteristic while bringing no changes on the balanced physical properties. The aluminosiloxane masterbatch is prepared by mixing aluminosiloxane and polypropylene at the weight ratio of 3:7–7:3, preferably of 5:5. The content of the aluminosiloxane masterbatch is preferred to be 1–10 wt % based on the total weight of the resin composition. When the content of the aluminosiloxane masterbatch is less than 1 wt %, it fails to improve the anti-scratch characteristic. In the meantime, when the content of the aluminosiloxane masterbatch is more than 10 wt %, further improvement in anti-scratch characteristic can hardly be achieved and it becomes inefficient in the light of weight and cost increase, thereby being undesirable.

The polypropylene resin composition of the present invention may further comprise a high density polyethylene (HDPE) to further improve anti-scratch characteristic. The content of the HDPE is preferred to be 1–10 wt % based on the total weight of the resin composition. When the content of the HDPE is less than 1 wt %, the effect of improving anti-scratch characteristic is not significant, thus being undesirable, and when the content of the HDPE is more than 10 wt %, thermal resistance becomes lowered along with the lowering of the rigidity, thus also being undesirable.

Also, the polypropylene resin composition of the present invention may further comprise a coloring agent. As for the coloring agent, any of those listed below can be used: for example, inorganic pigments such as aluminum flake, aluminum powder, aluminum foil, zinc powder, bronze powder, pearl mica, titan white, zinc oxide, zinc sulfide, chrome yellow, barium yellow, ultramarine blue, cobalt blue, cobalt green, carbon black or the like, or organic pigments such as Watchung Red, Permanent Red, Palladium Red, Toluidine Red, Benzidine Yellow, Phthalocyanine Green or the like. The coloring agent may be added as it is, or in the form of a masterbatch by mixing with polypropylene at an appropriate ratio in advance. The content of the coloring agent is preferred to be 1–10 wt % based on the total weight of the resin composition for obtaining a coloring effect without affecting to the physical properties of the resin composition.

Besides above-mentioned ingredients, other well-known additives conventionally used in this field may be further included in the polypropylene resin composition of the present invention. For instance, a long-term heat stabilizer, a stabilizer for weatherability, an antistatic agent, a lubricant, a slipping agent, a nucleating agent, a flame retardant or the like can be added in an appropriate range as long as achieving the object of the present invention.

Hereinafter, the present invention is further described in detail by the examples below. However, these examples provided below by no means limit the scope of the present invention.

EXAMPLES

Example 1

A resin composition was prepared by adding an aluminosiloxane masterbatch (NEO PP4100P) to a high crystalline polypropylene (PP-1) and mixing them together in an extruder. Then, under the consideration of the degradation of physical properties owing to water absorption, the resulted composition was dried in an oven at 80° C. for 3 hours. With the dried composition, a specimen for testing appearance was prepared by using an injection molding machine FCM-140 with clamping force of 140 tons, manufactured by Samsung-Klockner. The injection molding was conducted at the injection temperature of 180/200/200/200/200° C. from the feeding hopper to the nozzle, and under the injection pressure of 60–100 bar. Gloss of the prepared specimen for testing appearance was measured as 60° gloss value by a gloss meter according to ASTM D1003.

Scratch property was measured with the specimen for testing appearance, by mounting a scratch needle to a weight with variously changing load and measuring the degree of change according to the load change. The results were represented in Table 1 below.

Example 2

Specimens for testing appearance and physical properties were prepared by the same method as in Example 1, except that the content of the aluminosiloxane masterbatch was 2.5 wt %. Then, physical properties thereof were determined by the same method as in Example 1. The results were represented in Table 1 below.

Comparative Example 1

Specimens for testing appearance and physical properties were prepared by the same method as in Example 1, except that NEO PP4100P was not used. Then, the physical properties thereof were determined by the same method as in Example 1. The results were represented in Table 1 below.

TABLE 1

|  |  | Example 1 | Example 2 | Comparative example 1 |
|---|---|---|---|---|
| PP-1[1] (wt %) |  | 98.8 | 97.6 | 100 |
| NEO PP4100P[2] (wt %) |  | 1.2 | 2.4 | — |
| Gloss (60°)(%) |  | 81.7 | 81.7 | 81.9 |
| Scratch width | 300 g × 0.5 mm Φ | 160 | 100 | 220 |
| (μm) | 500 g × 0.5 mm Φ | 240 | 180 | 300 |

[1] PP-1: an ethylene-propylene copolymer with the ethylene content of 6.5 wt %, Rockwell hardness of 95, melt index of 8 g/10 min and isotactic pentad ratio of 96% or more.
[2] NEO PP4100P: an aluminosiloxane masterbatch prepared by mixing an aluminosiloxane and a polypropylene having the melt index of 10 g/10 min at the ratio of 5:5.

As seen from above Table 1, it can be known that, by just adding an aluminosiloxane masterbatch to a high crystalline polypropylene base resin, the anti-scratch performance was improved.

Example 3

A resin composition was prepared by feeding the ingredients shown in Table 2 below into an extruder at once and mixing them together. Then, under the consideration of the degradation of physical properties owing to water absorption, the resulted composition was dried in an oven at 80° C. for 3 hours. With the dried composition, a specimen for testing appearance was prepared by using an injection molding machine FCM-140 with clamping force of 140 tons, manufactured by Samsung-Klockner. The injection molding was conducted at the injection temperature of 180/200/200/200/200° C. from the feeding hopper to the nozzle, and under the injection pressure of 60–100 bar. Scratch property was measured with the specimen for testing appearance, by mounting a scratch needle to a weight with variously changing load and measuring the degree of change according to the load change. The results were represented in Table 2 below.

Further, a resin composition of the high crystalline polypropylene (PP-1) blended with the aluminosiloxane masterbatch (NEO PP4100P) was pelletized by using a twin screw extruder, then dried at 60° C. for 8 hours for preventing the introduction of water, and injection-molded to provide a test specimen for measuring physical properties thereof. The physical properties of thus prepared specimen were measured after 48 hours or more of keeping at room temperature. With the obtained test specimen for measuring physical properties, physical properties were measured according to ASTM, wherein melt index was measured according to ASTM D1238 at 230° C. under 2.16 kg load; density was measured according to ASTM D 1505; tensile strength and elongation were measured according to ASTM D638 with a 3.2 mm-thick specimen at the speed of 50 mm/min; flexural strength and flexural modulus were measured according to D790 with a specimen having 3.2 mm thickness and 48 mm span, at the speed of 5 mm/min; IZOD impact strength (−30° C.) was measured by Izod impact test with a notched specimen having 3.2 mm thickness; surface hardness as Rockwell hardness or Shore A hardness was measured according to ASTM D785; and heat deformation temperature (HDT), a temperature at which deformation is occurred under 4.6 kg loads, was measured by using a HDT meter. The results were represented in Table 2 below.

Example 4

Specimens for the outer appearance test and physical property test were prepared by the same method as in Example 3, except that the species and the content of the high crystalline polypropylene were varied as shown in Table 2, and the content of the aluminosiloxane masterbatch was 5 wt %. Then, physical properties thereof were determined by the same method as in Example 3. The results were represented in Table 2 below.

Comparative Example 2

Specimens for testing appearance and physical properties were prepared by the same method as in Example 3, except that the high crystalline polypropylene were varied as shown in Table 2 and the aluminosiloxane masterbatch was not used. Then, physical properties thereof were determined by the same method as in Example 3. The results were represented in Table 2 below.

Comparative Example 3

Specimens for testing appearance and physical properties were prepared by the same method as in Example 3, except that the high crystalline polypropylene were varied as shown in Table 2 and the aluminosiloxane masterbatch was replaced with 5 wt % of a silicon masterbatch. Then, physical properties thereof were determined by the same method as in Example 3. The results were represented in Table 2 below.

Comparative Example 4

Specimens for testing appearance and physical properties were prepared by the same method as in Example 3, except that the high crystalline polypropylene were varied as shown in Table 2, 15 wt % of EXRB and 2 wt % of HDPE were included, and the rubber component (RTPO) and aluminosiloxane masterbatch were not used. Then, physical properties thereof were determined by the same method as in Example 3. The results were represented in Table 2 below.

TABLE 2

| Ingredients | Example 3 | Example 4 | Comparative example 2 | Comparative example 3 | Comparative example 4 |
|---|---|---|---|---|---|
| PP-2[3] (wt %) | 27 | 25 | 30 | 25 | 42 |
| PP-3[4] (wt %) | — | — | — | — | 20 |
| PP-4[5] (wt %) | 20 | 20 | 20 | 20 | — |
| RTPO[6] (wt %) | 23 | 23 | 23 | 23 | — |
| EXRB[7] (wt %) | 6 | 6 | 6 | 6 | 15 |
| HDPE[8] (wt %) | — | — | — | — | 2 |
| Talc[9] (wt %) | 21 | 21 | 21 | 21 | 21 |

TABLE 2-continued

| Ingredients | | Example 3 | Example 4 | Comparative example 2 | Comparative example 3 | Comparative example 4 |
|---|---|---|---|---|---|---|
| Silicon MB[10] (wt %) | | — | — | — | 5 | — |
| NEO PP4100P (wt %) | | 3 | 5 | — | — | — |
| Melt index (g/10 min) | | 37.1 | 36.8 | 38.1 | 36.6 | 23.9 |
| Density (g/cm$^3$) | | 1.046 | 1.047 | 1.045 | 1.044 | 1.043 |
| Tensile strength | | 208 | 206 | 205 | 206 | 190 |
| flexural modulus | | 23,465 | 23,650 | 23,900 | 22,500 | 21,500 |
| Impact strength | | 12.5 | 12.9 | 12.2 | 14.5 | 24.3 |
| HDT | | 126.9 | 125.9 | 125.7 | 125.3 | 125.3 |
| Scratch | 300 g × 0.5 mm Φ | 205 | 180 | 285 | 215 | 305 |
| width (μm) | 500 g × 0.5 mm Φ | 230 | 200 | 332 | 275 | 365 |

[3] PP-2: an ethylene-propylene copolymer with the ethylene content of 11.5 wt %, Rockwell hardness of 90, melt index of 30 g/10 min and isotactic pentad ratio of 96% or more.
[4] PP-3: an ethylene-propylene copolymer with the ethylene content of 11.5 wt %, Rockwell hardness of 84, melt index of 45 g/10 min and isotactic pentad ratio of 96% or more.
[5] PP-4: an ethylene-propylene copolymer with the ethylene content of 11.0 wt %, Rockwell hardness of 87, melt index of 60 g/10 min and isotactic pentad ratio of 96% or more.
[6] RTPO: a reactor-made thermoplastic polyolefin with an ethylene content of 23.0 wt %, Rockwell hardness of 38 and melt index of 40 g/10 min.
[7] EXRB: an ethylene-octene copolymer with a density of 0.864 g/cm$^3$, octene content of 42 wt %, Shore A hardness of 60, and melt index of 13 g/10 min.
[8] HDPE: a high density polyethylene.
[9] talc: those selected by the particle diameter within the range of 3–5 μm.
[10] Silicon MB: a silicon masterbatch prepared by mixing an silicon oil and a polypropylene having the melt index of 10 g/10 min at the ratio of 5:5.

As seen from the above Tables 1 and 2, the comparative example 3 using the silicon masterbatch showed decreased flexural modulus although anti-scratch characteristic was improved. However, the examples using the aluminosiloxane masterbatch showed improvement in anti-scratch characteristic, substantially without changing or damaging the impact properties and other required physical properties. Particularly, when the aluminosiloxane masterbatch was used, the anti-scratch characteristic improved distinctively, as compared with the same amount of silicone masterbatch.

INDUSTRIAL APPLICABILITY

The present invention provides a polypropylene resin composition comprising an aluminosiloxane masterbatch which can make a selective improvement of anti-scratch characteristic without causing other changes in physical properties of a conventional polypropylene resin composition.

What is claimed:

1. A polypropylene resin composition having anti-scratch characteristic comprising 35–92 wt % of a high crystalline polypropylene resin having 96% or more of isotactic pentad ratio measured by C$^{13}$-NMR, 1–30 wt % of a rubber component, 5–35 wt % of an inorganic filler and 1–10 wt % of an aluminosiloxane masterbatch.

2. The polypropylene resin composition according to claim 1, wherein the high crystalline polypropylene resin has a melt index of 8–60 g/10 min, and is selected from the group consisting of a propylene homopolymer, a propylene-α-olefin copolymer and mixtures thereof.

3. The polypropylene resin composition according to claim 1, wherein the rubber component is at least one selected from the group consisting of amorphous ethylene-α-olefin copolymers and styrene-based thermoplastic elastomers.

4. The polypropylene resin composition according to claim 1, wherein the inorganic filler is a talc having an average particle size of 3–6 μm.

5. The polypropylene resin composition according to claim 1, wherein the aluminosiloxane masterbatch is prepared by mixing aluminosiloxane and polypropylene at the weight ratio of 3:7–7:3.

6. The polypropylene resin composition according to claim 1, further comprising 1–10 wt % of a high density polyethylene.

7. The polypropylene resin composition according to claim 2, further comprising 1–10 wt % of a high density polyethylene.

8. The polypropylene resin composition according to claim 3, further comprising 1–10 wt % of a high density polyethylene.

9. The polypropylene resin composition according to claim 4, further comprising 1–10 wt % of a high density polyethylene.

10. The polypropylene resin composition according to claim 5, further comprising 1–10 wt % of a high density polyethylene.

11. The polypropylene resin composition according to claim 1, further comprising 1–10 wt % of a coloring agent masterbatch.

12. The polypropylene resin composition according to claim 2, further comprising 1–10 wt % of a coloring agent masterbatch.

13. The polypropylene resin composition according to claim 3, further comprising 1–10 wt % of a coloring agent masterbatch.

14. The polypropylene resin composition according to claim 4, further comprising 1–10 wt % of a coloring agent masterbatch.

15. The polypropylene resin composition according to claim 5, further comprising 1–10 wt % of a coloring agent masterbatch.

* * * * *